Dec. 16, 1930. J. HOLOUBEK 1,785,348
CRAB TRAP
Filed Nov. 21, 1929
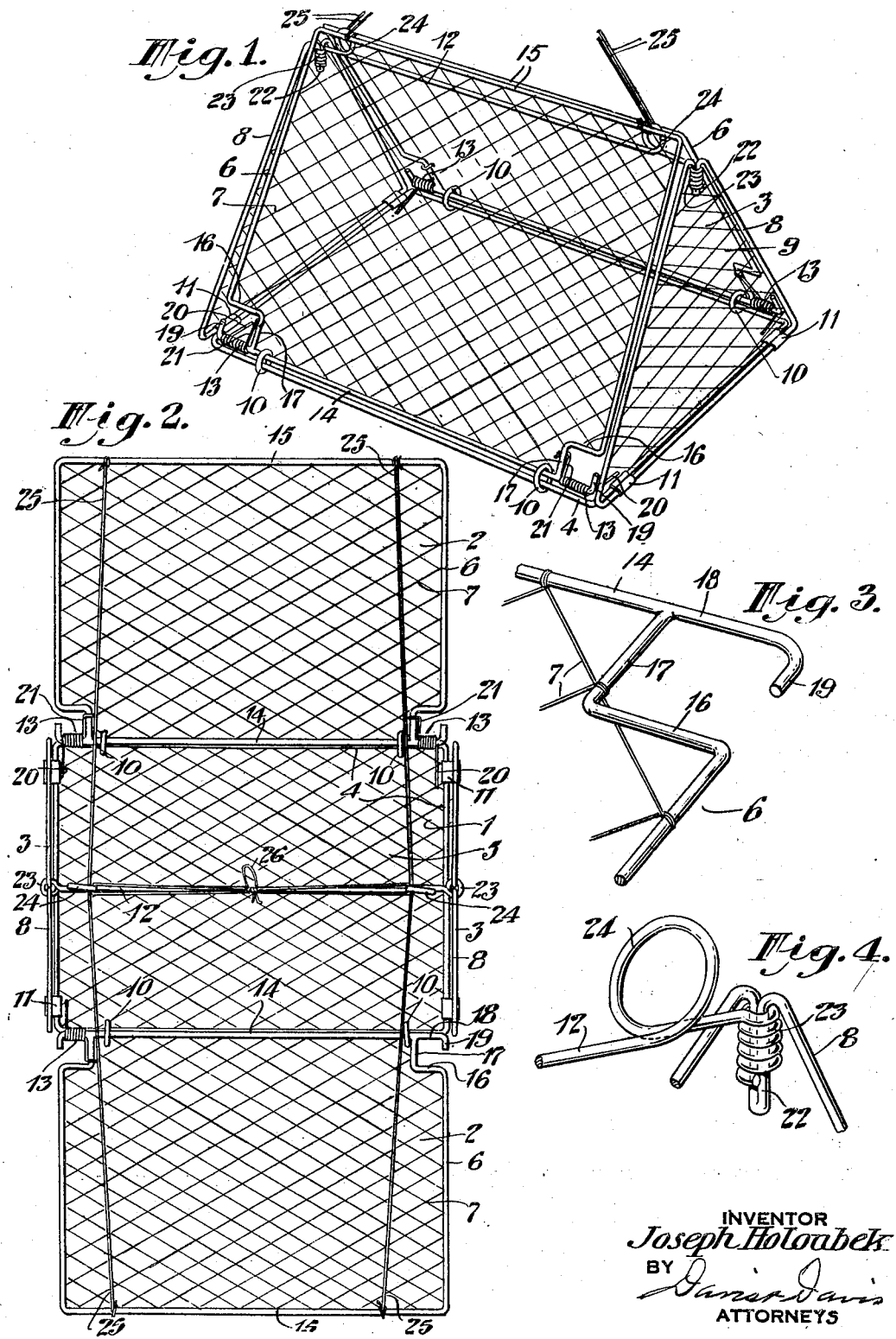

Patented Dec. 16, 1930

1,785,348

UNITED STATES PATENT OFFICE

JOSEPH HOLOUBEK, OF NEW YORK, N. Y.

CRAB TRAP

Application filed November 21, 1929. Serial No. 408,735.

This invention relates to improvements in traps for catching crabs, lobsters, or the like, and more particularly to a type of trap in which a plurality of hinged members form the sides of the trap and are adapted to fold together to close the trap and to unfold to open it. In such traps springs are usually employed for swinging the sides to open positions, and heretofore said springs have been mounted in such manner that the removal and replacement of a broken or defective spring necessitated the unhinging of the side members. This is a difficult operation and often to avoid it the trap is either used in a defective condition or is discarded. Important objects of the present invention are, to provide a trap designed to facilitate the mounting and removal of said springs, and to provide certain other improvements in the trap structure.

In the drawing,

Fig. 1 is a perspective view of my improved trap in a closed condition;

Fig. 2 a plan view of the trap showing it opened;

Fig. 3 a detail perspective view showing one of the improved spring mountings; and Fig. 4 a detail perspective view of another improved structural detail.

The trap includes a bottom member 1, two side members or leaves 2 and two end members 3. The bottom member consists of a substantially rectangular wire frame 4 covered by a suitable open mesh wire fabric or netting 5. Each side member 2 is also formed by a substantially rectangular wire frame 6 covered by wire netting 7. Each end member 3 consists of a substantially triangular wire frame 8 covered by wire netting 9. There are hinge connections 10 between the side members and the bottom member adapting the side members to swing upwardly and downwardly for closing and opening the trap. Between the end members and the bottom members there are hinge connections 11 adapting said members to fold downwardly or collapse against the bottom member when the trap is not in use. Normally the end members are held upright by a connecting member 12 which will be described hereinafter.

Springs 13 are provided for swinging the hinged side members or leaves 2 downwardly to open position. These springs are carried by the side members and the latter are designed to provide an improved mounting for the springs. The frame 6 of each leaf is preferably formed of two strands of stout, stiff wire. One strand 14 forms the hinged side of the frame while the other strand 15 is bent into a substantially U-form and defines the opposite free side of the frame and the ends thereof. In the present instance the hinge connections 10 between strand 14 and the bottom frame 4 are in the form of wire rings and they occupy positions spaced inwardly from the opposite ends of the hinged members. Each frame end formed by the strand 15 is bent inwardly at a point suitably spaced from strand 14, extended inwardly as at 16 parallel to strand 14 and again bent at a right angle and extended as at 17 to meet the strand 14 at a point located just outwardly of the adjacent hinge 10. At this juncture the two strands are joined in any suitable manner as by welding or soldering. Thus each corner of the frame at the hinged side thereof is formed with a notch to provide clearance for the springs. Each end portion of strand 14 extends straight outwardly beyond the juncture of the strand section 17 therewith and forms a pintle 18 for mounting one of the springs 13. At its outer extremity pintle 18 is bent to form a short spring-retaining end 19 alining with the adjacent frame end.

The springs 13 are of the torsion type and each is formed with quite a number of coils and with laterally extending ends 20 and 21, the latter being formed with a hook. Each of the four springs is mounted to encircle one of the pintles 18 with its end 20 bearing preferably against the bottom of the trap and its hooked end engaging the frame section 17 in a manner to exert a thrust tending to swing the hinged frame outwardly and downwardly to open the trap. This manner of mounting the springs, outwardly of the hinge connections 10, provides for their easy removal. When a spring breaks or loses its resilience it may be removed by merely freeing its ends 20 and 21 and withdrawing its coiled portion endwise from the pintle 18 and its retaining end 19. The latter buttresses the spring and prevents displacement thereof, but the retaining end merges with the body of the pintle along an easy curve and permits the spring to be withdrawn by applying a little force. There is a gap of material width between the end 19 and the opposed frame portion 16 to provide liberal clearance for the removal of the spring. It will be obvious that the mounting in place of a new spring will be quite as easy as the removal of a defective one. Both the mounting and the removal of all of the springs is accomplished without disturbing the hinge connections.

The frame 8 of each end member of the trap is preferably formed of a single strand of wire bent into a triangular form. At the apex of the triangle the strand is bent inwardly to form a straight slender teat 22 extending straight downwardly within the apex. The connecting member 12 extends between the apexes of the triangles and forms a ridge member at the top of the trap. It consists of a single strand of stout, stiff wire formed at its opposite ends with a number of depending coils 23 of a size and shape to snugly receive the teats 22 and frictionally hold the member 12 in place. Said member thereby holds the frame ends properly spaced and upright and makes connections with them for lifting the trap. Near its coiled ends member 12 is looped to form eyes 24 through which cords 25 for casting and lifting the trap are trained. Two strands of said cords are connected to the outer edge of each leaf 2, and trained through the eyes 24. Above the member 12 all of the strands are joined together and provided with a lifting loop 26 whereby when said loop is drawn upwardly the leaves 2 will first be swung to closed position against the resistance of springs 13 and next the trap will be lifted. When it is desired to collapse the trap the coiled ends 23 of the ridge member are forcibly slid downward to disengage them from the teats 22. Thereby the end members are freed and may be swung downwardly upon the bottom member. The side leaves 2 are then also free to fold against the bottom member and the entire trap occupies a flat compact space.

While I have shown a very satisfactory form of my invention I do not wish to be limited strictly to this disclosure but reserve the right to make such changes as will lie within the scope of the claims.

What I claim is:

1. A trap of the type described comprising a bottom member; a plurality of leaves to form the sides of the trap; hinge means between said leaves and the bottom member adapting the leaves to fold upwardly and downwardly to close and open the trap; spring mountings in the form of pintles carried by the leaves at the opposite ends thereof, extending axially outward beyond the hinge means and having their outer ends free; and coiled torsion springs encircling said pintles outwardly of the hinge means and engaging the leaves to swing them downwardly, the spring mountings adapting the springs to be inserted or removed endwise.

2. In a trap of the type described, a bottom member; a leaf to form one side of the trap formed by a wire frame, and a foraminous covering for said frame; hinge means connecting one side of said frame to the bottom member and adapting the leaf to fold upwardly and downwardly to close and open the trap, said hinge means being spaced axially inward from one end of the hinged side of the frame; a spring mounting formed by extending the hinged side of the frame outwardly beyond the inwardly spaced hinge means and leaving its outer end free; and a coiled torsion spring encircling said mounting and engaging the leaf to swing it downwardly, said spring mounting and the adjacent corner of the frame being formed to provide clearance for the endwise insertion and removal of the spring.

3. In a trap of the type described, a member to form one wall of the trap including a frame defining the outline of said member; a member to form another wall of the trap; hinge means connecting one side of said frame to said second member to adapt the two members to swing relatively to each other for opening and closing the trap, said hinge means being spaced axially inward from one side of the frame; a spring mounting formed by extending the hinged side of the frame outwardly beyond the inwardly spaced hinge means and leaving its outer end free; and a coiled torsion spring encircling said mounting and engaging one of said members to swing it relatively to the other member, said spring mounting and the adjacent corner of the frame being formed to provide clearance for the endwise insertion and removal of the spring.

4. In a trap of the type described, a bottom member; a leaf to form one side of the trap formed by a wire frame, and netting covering said frame; hinge connections between one side of said frame and the bottom member adapting the leaf to fold upwardly and downwardly to close and open the trap, said hinge connections being spaced axially inward from the opposite ends of the frame and the opposite ends of the frame at the hinged side thereof being bent inwardly to define corner notches located outwardly of the hinge connections; spring mountings formed by extending the opposite end portions of the hinged side of the frame axially past said notches and bending them to form free spring-retaining ends; and coiled torsion springs mounted to encircle said mountings and engage the leaf to swing it downwardly, the mountings and the notches adapting the springs to be removed outwardly by drawing them endwise around said retaining ends.

5. In a trap of the type described, a member to form one wall of the trap including a frame defining the outline of said member; a member to form another wall of the trap; hinge means connecting one side of said frame to said second member to adapt the two members to swing relatively to each other for opening and closing the trap, said frame being formed at its hinged side with an inward bend forming a clearance notch for a spring; a pintle to form a spring mounting fixed at one end to the frame at the hinged side thereof, extending across said notch in a direction substantially parallel to the hinge axis and free at its opposite end; and a coiled torsion spring encircling said pintle and engaging one of said trap members to swing it relatively to the other member, said pintle and the frame notch being formed to provide clearance for the endwise insertion and removal of the spring.

6. In a trap of the class described, a member to form one wall of the trap; a member to form another wall of the trap; hinge means connecting said wall-forming members adapting one member to swing relatively to the other and spaced axially inward from one side of the trap; a spring mounting in the form of a pintle carried by one of said members extending axially outward beyond the inwardly spaced hinge means and having its outer end free; and a coiled torsion spring encircling said pintle outwardly of the hinge means and engaging said relatively swinging member to swing it, the spring mounting adapting the spring to be inserted or removed endwise over the free end of the pintle.

7. In a trap of the type described, a member to form one wall of the trap; a member to form another wall of the trap; hinge means connecting said members along adjacent edges thereof; a spring mounting in the form of a pintle carried by one of said members at its hinged edge and disposed with its axis substantially coincident with the axis of said hinged means and having one end free; and a coiled torsion spring encircling said pintle and engaging one of said wall members to swing it relatively to the other member, the hinged edge of the pintle-bearing wall member being formed with a notch providing clearance for endwise withdrawal of the spring from the pintle past the free end of the latter.

In testimony whereof I hereunto affix my signature.

JOSEPH HOLOUBEK.